United States Patent [19]
Shouji et al.

[11] Patent Number: 6,033,580
[45] Date of Patent: Mar. 7, 2000

[54] THIN FILM MAGNETIC HEAD WITH SPECIAL POLE CONFIGURATION

[75] Inventors: Shigeru Shouji, Hamamatsu, Japan; Shuichi Sawada, San Jose, Calif.

[73] Assignee: Yamaha Corporation, Japan

[21] Appl. No.: 09/001,175

[22] Filed: Dec. 30, 1997

Related U.S. Application Data

[62] Division of application No. 08/787,000, Jan. 21, 1997, Pat. No. 5,831,801.

[51] Int. Cl.[7] .................................................. G11B 5/127
[52] U.S. Cl. ................................ 216/22; 216/38; 216/39; 216/52; 29/603.15; 29/603.16
[58] Field of Search ............................... 360/126; 216/22, 216/38, 39, 52; 29/603.15, 603.16, 603.18

[56] References Cited

U.S. PATENT DOCUMENTS

| | | | |
|---|---|---|---|
| 4,391,849 | 7/1983 | Bischoff | 427/129 |
| 4,589,042 | 5/1986 | Anderson et al. | 360/125 |
| 4,716,484 | 12/1987 | Kaminaka et al. | 360/125 |
| 4,819,112 | 4/1989 | Iwata et al. | 360/126 |
| 4,837,923 | 6/1989 | Brar et al. | 29/603 |
| 4,839,197 | 6/1989 | Henderson et al. | 427/116 |
| 5,047,886 | 9/1991 | Toyoda et al. | 360/126 |
| 5,068,959 | 12/1991 | Sidman | 29/603 |
| 5,126,907 | 6/1992 | Hamakawa et al. | 360/126 |
| 5,283,942 | 2/1994 | Chen et al. | 29/603 |
| 5,285,340 | 2/1994 | Ju et al. | 360/119 |
| 5,373,408 | 12/1994 | Bischoff et al. | 360/126 |
| 5,452,164 | 9/1995 | Cole et al. | 360/113 |
| 5,479,310 | 12/1995 | Atsushi et al. | 360/126 |
| 5,802,700 | 9/1998 | Chen et al. | 29/603.14 |
| 5,890,278 | 4/1999 | Van Kesteren | 29/603.14 |

FOREIGN PATENT DOCUMENTS

| | | |
|---|---|---|
| 57-179929 | 11/1982 | Japan . |
| 4-356704 | 12/1992 | Japan . |
| 10-334410 | 12/1998 | Japan . |

*Primary Examiner*—Randy Gulakowski
*Assistant Examiner*—Anita Alanko
*Attorney, Agent, or Firm*—Ostronlenk, Faber, Gerb & Soffen, LLP

[57] ABSTRACT

On a substrate, a lower pole is formed being embedded in a protective film on which a gap layer is formed. On this gap layer, a first upper pole is formed facing the lower pole. A protective film is formed coplanar to the upper surface of the first upper pole. On this protective film, a coil made of a plurality of coil layers is formed being embedded in an insulating film. On the insulating film, an upper core layer is formed whose tip portion constitutes a second upper pole stacked upon the first upper pole and magnetically coupled thereto. The first upper pole formed before the coil is formed and the second upper pole formed after the coil is formed, constitute an upper pole.

18 Claims, 23 Drawing Sheets

FIG.15
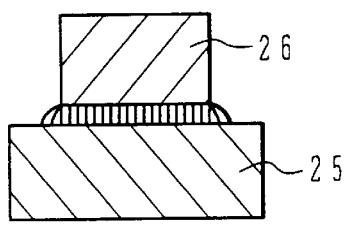
FIG.16A FIG.16B FIG.16C
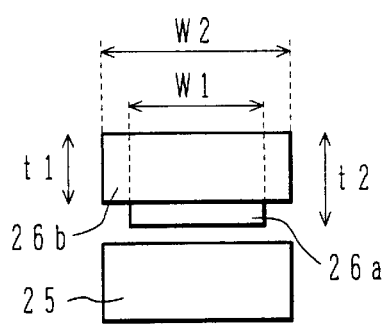 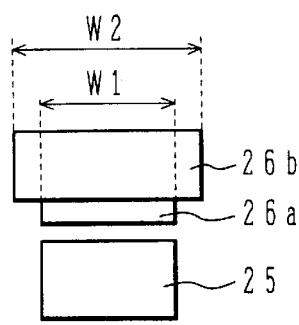 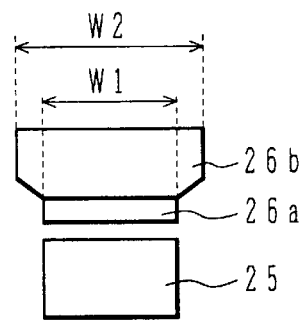

THIN FILM MAGNETIC HEAD WITH SPECIAL POLE CONFIGURATION

This is a Division of application Ser. No. 08/787,000, filed Jan. 21, 1997 now U.S. Pat. No. 5,831,801.

BACKGROUND OF THE INVENTION a) Field of the Invention

The present invention relates to a thin film magnetic head for recording or reproducing data in or from a magnetic recording medium, the thin film magnetic head being of the type that a magnetic path is formed between upper and lower magnetic core layers of upper and lower poles with a gap layer being interposed therebetween.

b) Description of the Related Art

An example of conventional thin film magnetic heads is described, for example, in JP-A-4-356704 (now issued as U.S. Pat. No. 5,479,310). FIGS. 26, 27, and 28 illustrate a conventional manufacture method of a thin film magnetic head. FIG. 28 is a plan view, FIG. 26 is a cross sectional view showing a magnetic core in a longitudinal direction taken along line A—A of FIG. 28, and FIG. 27 is a cross sectional view of the magnetic core in a width direction taken along line B—B of FIG. 28. As shown in FIG. 26, an insulating layer 1 is formed on a substrate and a lower magnetic core-layer 2 is formed on the surface of the insulating layer 1. On the lower magnetic core layer 2, a magnetic gap layer 3 is formed. A plurality of coil layers 5 embedded in an insulating layer 4 is formed on the magnetic gap layer 3. A resist layer 6 is formed over the whole surface of the substrate, covering the insulating layer 4.

This resist layer 6 is patterned through exposure and development to form an opening 7 to be used for the formation of an upper magnetic core layer and an upper pole. The upper pole is formed at the tip portion 8 of the opening 7. In this tip portion, magnetic material such as 81-permalloy is embedded and the patterned resist layer 6 is removed to form the upper magnetic core and upper pole.

With this conventional manufacture method of a thin film magnetic head, however, the cross section of the tip portion 8 of the patterned resist layer 6 is wider at the upper area and narrower at the lower area, as shown in FIG. 27, and it is difficult to control the width of the upper pole and the widths of upper poles easily vary. The reason for this is as follows. The insulating layer 4 with the coil layers 5 being embedded has a bulky pattern with a thickness of 10 to 20 $\mu$m. In order to sufficiently cover this bulky pattern, the resist layer 6 for the formation of the upper magnetic core layer and upper pole is required to be deposited very thick. The resist pattern 6, particularly at the upper pole forming portion (tip portion), becomes thicker to 7 to 15 $\mu$m. If an upper pole pattern of 4 $\mu$m wide or less is formed after exposure and development of such a thick resist layer 6, its width is very unstable and varies. A precision 3$\sigma$ of the pole width is therefore +/−0.7 $\mu$m at the best. Such a large variation is not adequate for a thin film magnetic head to be used with a hard disk of narrow track and high density record.

Instead of 81-permalloy (81 Ni-19 Fe: by an weight ratio, the same notation is used in the following), magnetic material of high saturation magnetic flux density may be used as the material of the pole to apply dense magnetic fluxes to a magnetic recording medium. In this case, the magnetic flux density at the gap side of the pole becomes high and its slope becomes sharp, so that a strong signal can be written in a high performance recording medium with a high magnetic coercive force (Hc). The magnetization inversion transition area of a recording medium becomes narrow and sharp so that NLTS (nonlinear transition shift, also called NLBS (nonlinear bit shift)) is improved and a record density can be increased.

For example, as compared to a saturation magnetic flux density (Bs) of about 8000 G of 81-permalloy (81 Ni-19 Fe), Bs is about 16000 G for the high saturation magnetic flux density material such as 94 Co-6 Fe, 45 Ni-55 Fe, and FeTaN, and is about 15500 G for 30 Fe-25 Co-45 Ni. Such materials having saturation magnetic flux density higher than that of 81-permalloy may be used as the pole material in order to increase the record density.

Since the upper magnetic core layer and upper pole of a conventional thin film magnetic head are formed after a single photolithography process, both the upper magnetic core layer and upper pole are formed by the same material of high saturation magnetic flux density. Since the magnetostrictive coefficient $\pi$s of the high saturation magnetic flux density material is larger than 81-permalloy, if strains are formed in the core by its internal stress or thermal stress, the magnetic characteristics of material of high saturation magnetic flux density change greatly and are degraded. The upper magnetic core layer is susceptible to stresses and has a relatively large area. Therefore, if strains are generated in the upper magnetic core layer made of material of high saturation magnetic flux density, by internal stress or thermal stress, the magnetic core layer and the whole magnetic path are influenced greatly, being unable to obtain stable magnetic characteristics.

SUMMARY OF THE INVENTION

It is an object of the present invention to provide a thin film magnetic head having a high precision of an upper pole width and the magnetic characteristics adequate for a hard disk of narrow track and high record density, and being capable of improving NLTS and a record density by using high saturation magnetic flux material as the upper pole material.

According to one aspect of the present invention, there is provided a magnetic head comprising: a) a substrate; b) a lower magnetic layer, formed on the substrate, having a lower pole portion and a lower magnetic core portion; c) a non-magnetic gap layer made of non-magnetic material formed on the lower magnetic layer; d) a non-magnetic film formed on the non-magnetic gap layer; e) a first magnetic pole film formed on the non-magnetic gap layer, the first magnetic pole film being buried in the non-magnetic film and being coplanar to the non-magnetic film; and f) an upper magnetic layer having an upper pole portion and an upper core portion, the upper pole portion being magnetically connected to the first magnetic pole film.

The first magnetic pole film is first formed, and then the upper pole portion and upper core portion are formed at the same time. The first magnetic pole film and upper pole portion are formed independently so that the first magnetic pole film can be formed without being affected by the thickness of a magnetic coil and the width of the first magnetic pole film can be controlled at high precision. For example, the first magnetic pole film can be formed at a high width precision 3$\sigma$ of +/−0.2 $\mu$m or smaller. This magnetic head has a performance sufficient for use with a hard disk of narrow track and high record density.

BRIEF DESCRIPTION OF THE DRAWINGS

FIG. 15 is a diagram illustrating a problem associated with a quantity of magnetic fluxes.

FIGS. 16A to 16C are diagrams showing the relationship between the widths of upper and lower poles of the first embodiment.

DETAILED DESCRIPTION OF THE PREFERRED EMBODIMENTS

Figure 1:
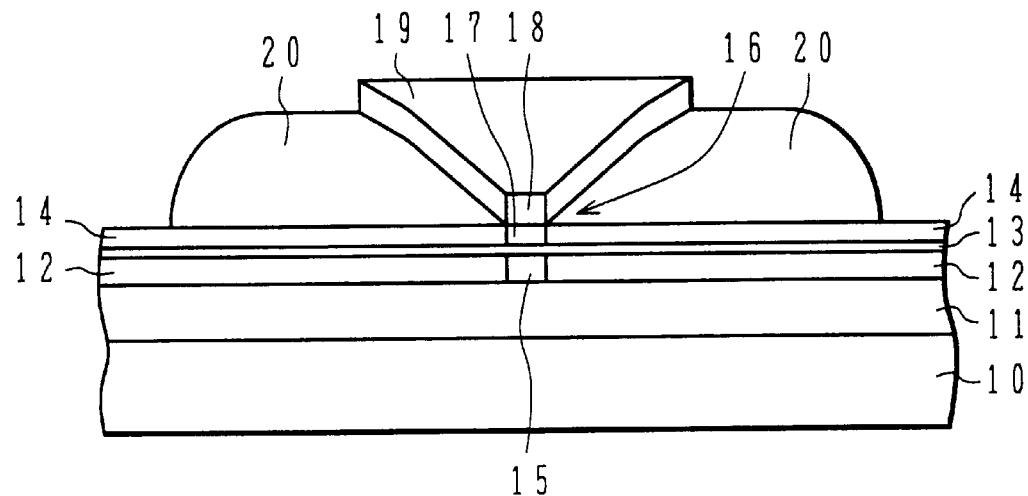
FIG. 1 is a front view of a thin film magnetic head according to a first embodiment of the invention.
Figure 2:
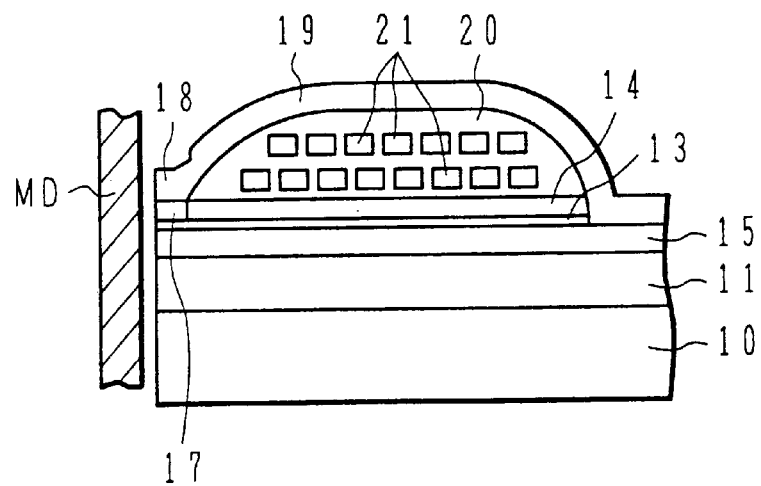
FIG. 2 is a cross sectional view of the thin film magnetic head in a longitudinal direction of the magnetic core at the pole center.

Embodiments of the invention will be described specifically with reference to the accompanying drawings. FIG. 1 is a front view of a thin film magnetic head according to the first embodiment of the invention, and FIG. 2 is a cross sectional view of the thin film magnetic head in the longitudinal direction of the magnetic core at the pole center.

In this specification, a term "upper" is defined as indicating an area of the thin film magnetic head where a coil layer 21 is formed for inducing magnetic fluxes across a gap layer 13, and a term "lower" is defined as indicating an area opposite to the upper area relative to the gap layer 13. Also in this specification, a longitudinal direction is defined as a direction generally perpendicular to a magnetic recording medium MD, a width direction is defined as a direction generally parallel to a magnetic recording medium MD and to a principal plane of poles 15', 17, and 18 of magnetic layers, and as a lateral direction of FIG. 1, and a height direction is defined as a direction generally parallel to a magnetic recording medium MD and to the principal plane of the poles 15', 17, and 18 of magnetic layers, and as a vertical direction of FIG. 1.

A protective film 11 is formed on a substrate 10. Another protective film 12 and a lower magnetic core 15 are formed on the protective film 11. The tip 15' of the lower magnetic layer 15, i.e., the portion facing the magnetic recording medium MD, serves as a lower magnetic pole portion, the other portions of the lower magnetic layer 15 serving as a lower magnetic core portion. The lower magnetic core layer 15 is formed being patterned and embedded in the protective film 12. On the protective layer 12 and lower magnetic core layer 15, a gap layer 13 of a predetermined length is formed on which a protective film 14 and a first upper pole 17 are formed. The first upper pole 17 is patterned from a magnetic film to have a predetermined width and a predetermined length. The protective film 14 has the same length as the gap layer 13. On the protective film 14, a plurality of coil layers 21 are formed being embedded in an insulating layer 20. This insulating layer 20 is bulky having a thickness of 10 to 20 μm similar to a conventional magnetic head. On the insulating layer 20, an upper magnetic layer 19 is formed whose tip is stacked on the tip of the first upper pole 17 and magnetically coupled thereto and whose remaining portions constitute an upper portion. The upper magnetic core layer 19 is patterned after a single photolithography process. The tip of the magnetic layer 19 stacked upon the first upper pole 17 serves as a second upper pole 18 which constitutes an upper pole 16 together with the first upper pole 17. The thin film magnetic head can record and reproduce data in and from a magnetic recording medium MD facing the poles 15', 17, and 18.

Figure 3A:
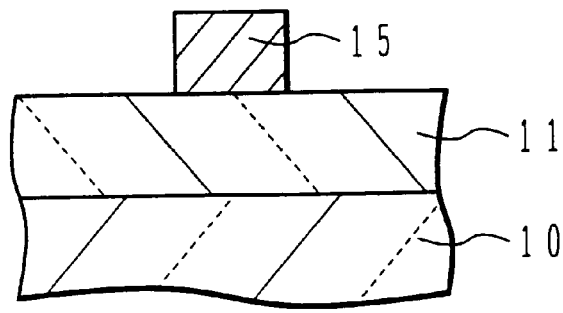
FIGS. 3A to 12B are cross sectional views illustrating manufacture processes of a thin film magnetic head of the first embodiment, taken along the width direction of the magnetic core and along the longitudinal direction of the magnetic core.

Next, a manufacture method of the thin film magnetic head constructed as above will be described. FIGS. 3A to 12B are cross sectional views illustrating the processes of manufacturing a thin film magnetic head. FIGS. 3A, 4A, . . . , 12A are cross sectional front views, and FIGS. 3B, 4B, . . . , 12B are cross sectional side views. FIGS. 6C, 6E, and 6G are cross sectional front views, and FIGS. 6D, 6F, and 6H are cross sectional side views.

Figure 3B:
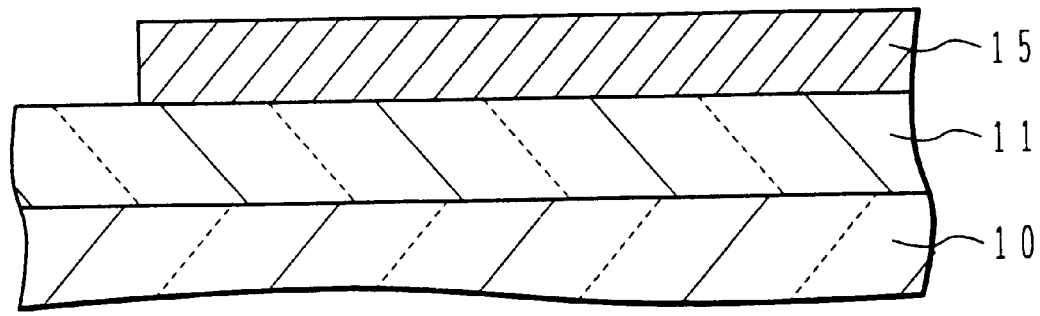
Figure 4A:
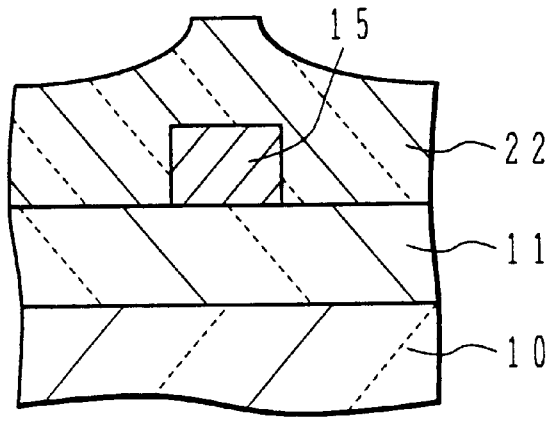

As shown in FIGS. 3A and 3B, on a substrate 10 made of, for example, $Al_2O_3$—TiC (ceramic), a protective layer 11 of $SiO_2$, $Al_2O_3$, or the like is formed by sputtering. On the protective film 11, a lower magnetic core layer 15 of a predetermined width is formed. The lower magnetic core layer 15 is made of, for example, permalloy.

Figure 4B:
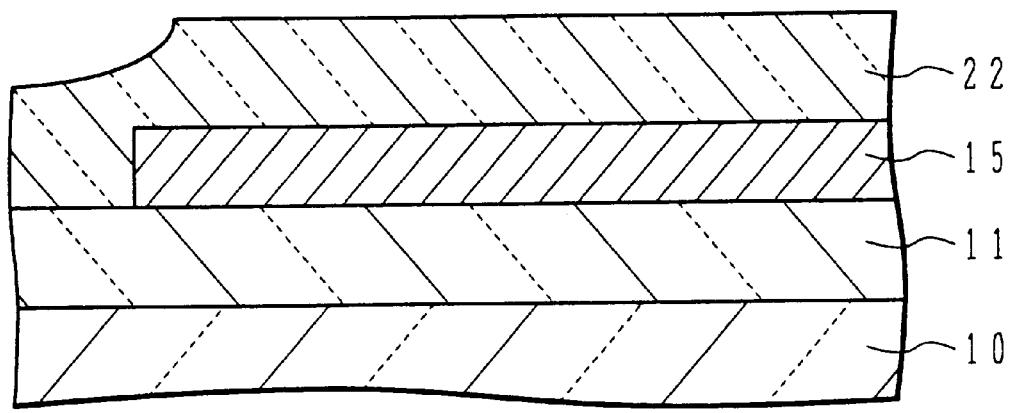

As shown in FIGS. 4A and 4B, an $Al_2O_3$ film 22 is formed over the whole surface by sputtering.

Figure 5A:
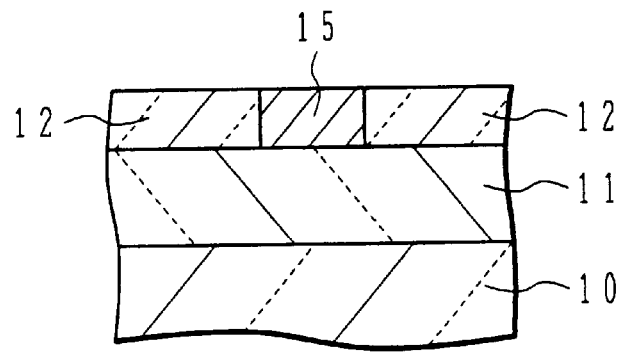
Figure 5B:
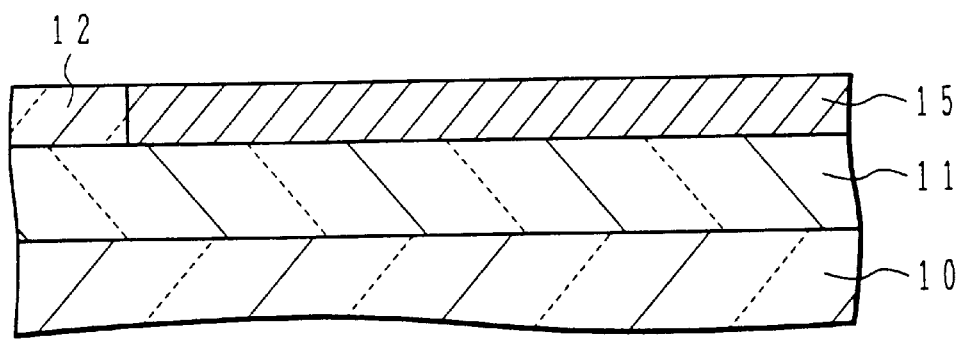

As shown in FIGS. 5A and 5B, the $Al_2O_3$ film 22 is polished to planarize the surface thereof. The lower magnetic core layer 15 is therefore embedded in a protective film 12 made of the $Al_2O_3$ 22, and the upper surface of the lower magnetic layer 15 is coplanar to the upper surface of the protective film 12.

Figure 6A:
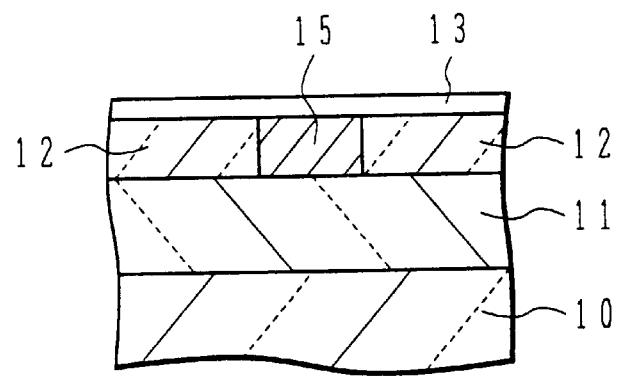
Figure 6B:
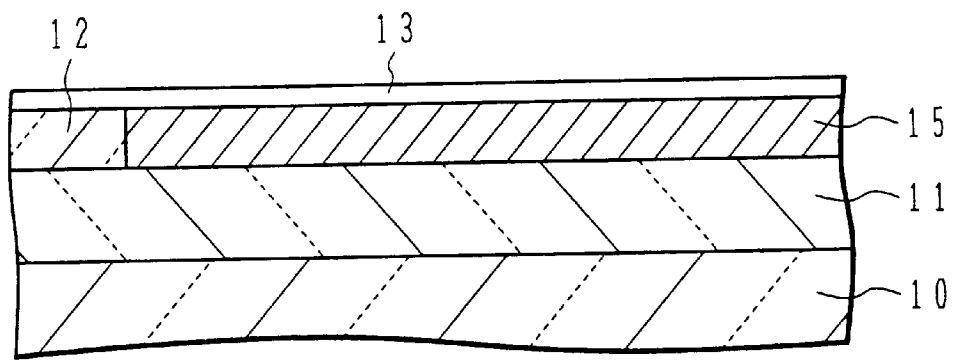
Figure 6C:
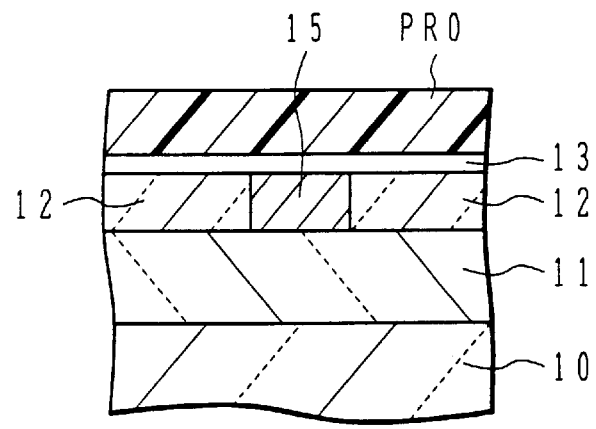
Figure 6D:
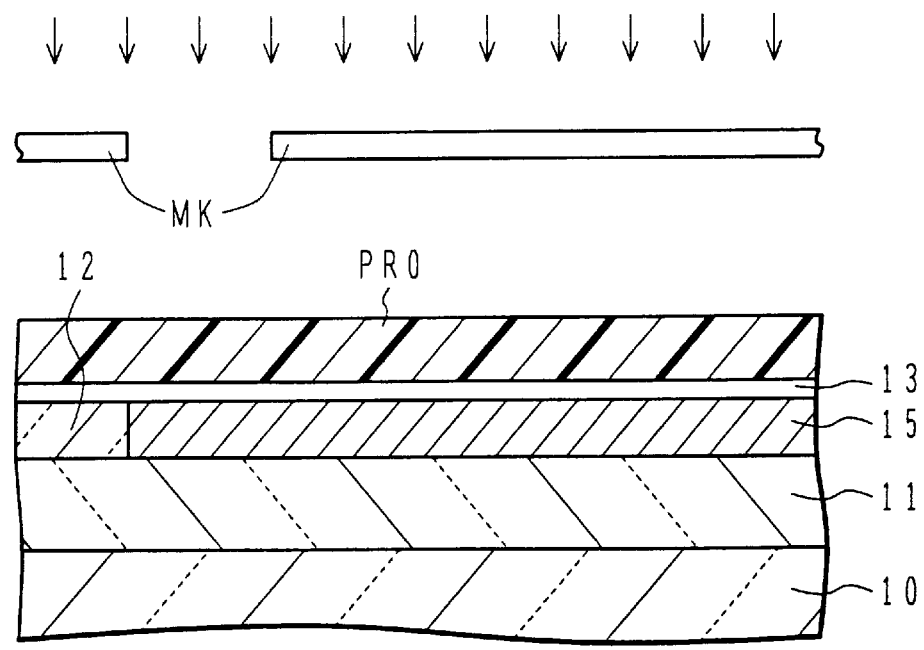
Figure 6E:
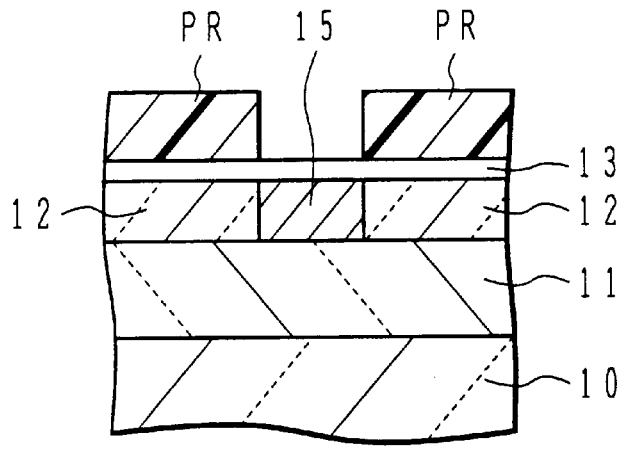
Figure 6F:
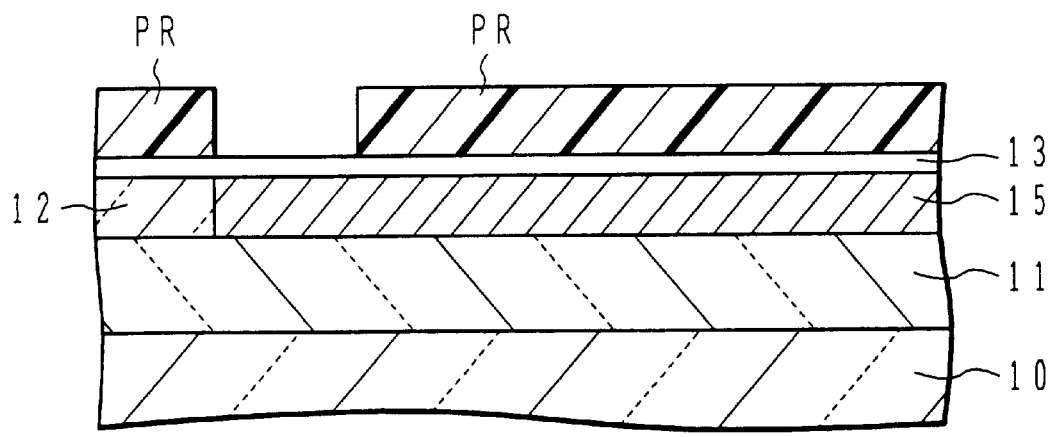
Figure 6G:
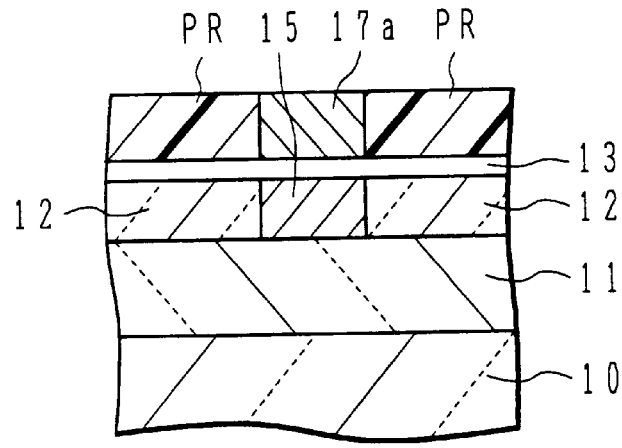
Figure 6H:
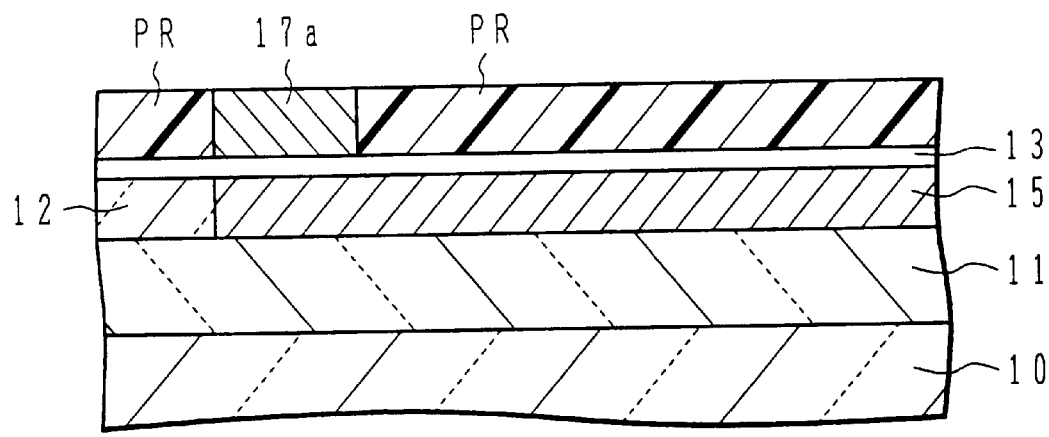

Thereafter, as shown in FIGS. 6A and 6B, a gap layer 13 made of non-magnetic material such as $Al_2O_3$ is formed.

As shown in FIGS. 6C and 6D, a resist film PRO is coated on the flat surface of the gap layer 13. By using a mask MK having a pattern of a first upper pole to be later formed, the resist film PRO is patterned by photolithography.

As shown in FIGS. 6E and 6F, the patterned resist film PR has an opening corresponding to the first upper pole. Since the resist film pattern PR is formed on the flat gap layer 13, it is not necessary to deposit too thick. Therefore, the side wall of the opening is made generally vertical so that the widths of the opening at the lower and higher positions do not change. It is therefore possible to control the width of the first upper pole at high precision.

As shown in FIGS. 6G and 6H, a film 17a is formed embedding the opening of the patterned resist film PR by electroplating. The film 17a is made of, for example, permalloy.

Figure 7A:
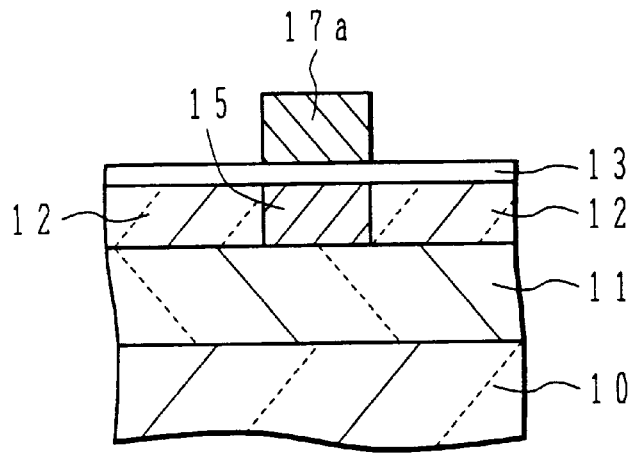
Figure 7B:
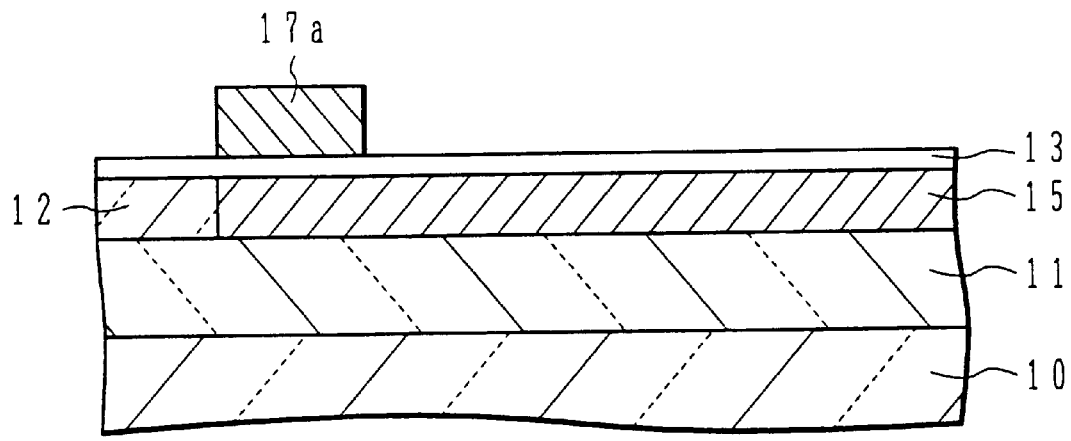

As show in FIGS. 7A and 7B, the resist film PR is removed to leave only the film 17a. The first upper pole 17a is positioned at the area corresponding to the lower magnetic core layer 15, and has the same width as the lower magnetic core layer 15 and a length necessary for satisfying the pole function.

Figure 8A:
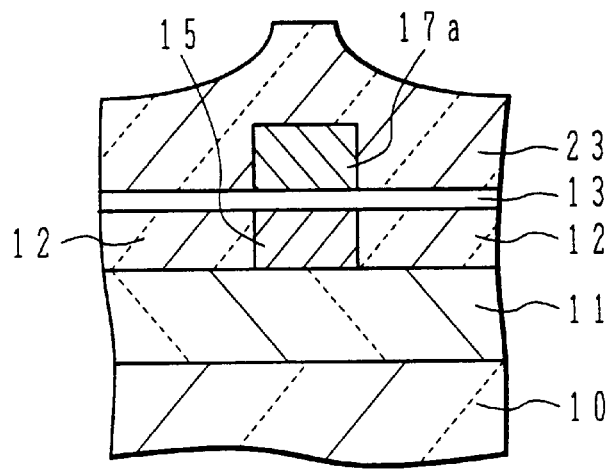
Figure 8B:
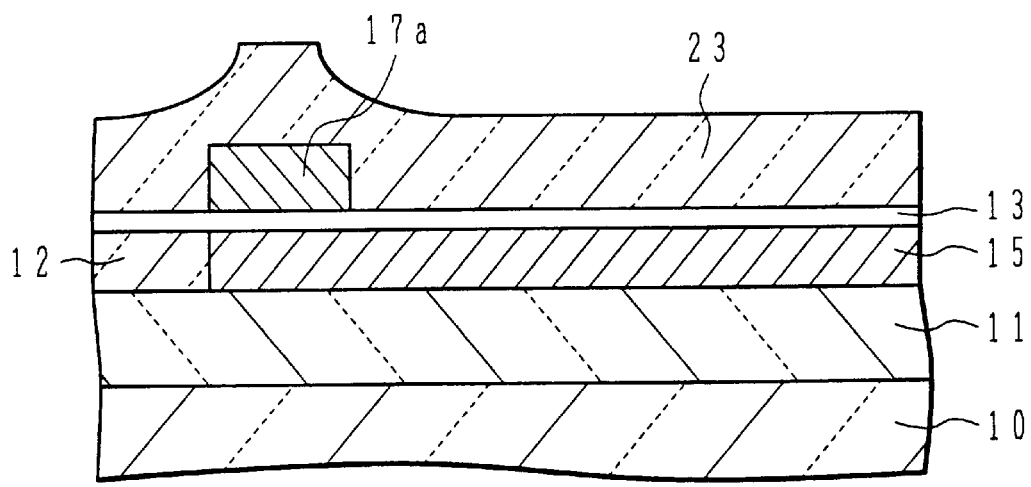

As shown in FIGS. 8A and 8B, an $Al_2O_3$ film 23 is deposited through sputtering over the whole surface including the film 17a.

Figure 9A:
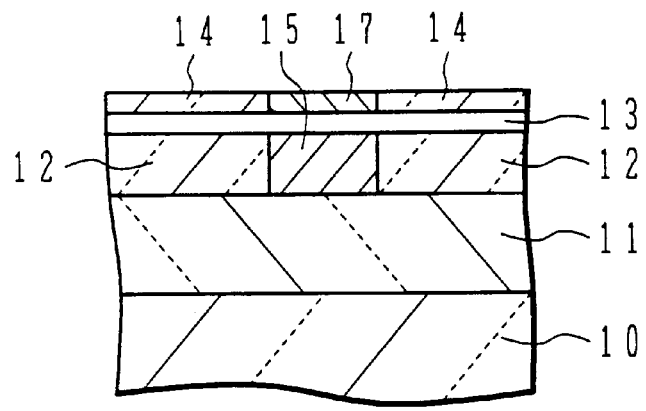
Figure 9B:
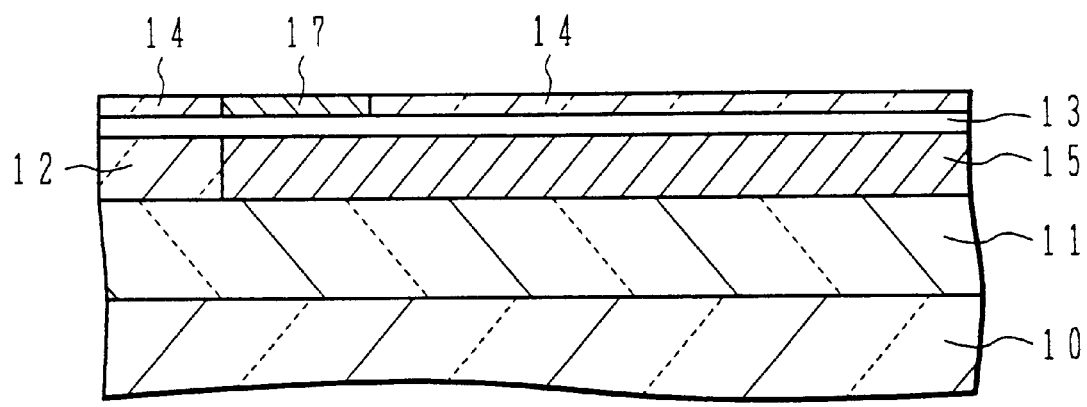

As shown in FIGS. 9A and 9B, the surface of the $Al_2O_3$ film 23 is polished to obtain the first upper pole 17 from the film 17a embedded in the protective film 14 of $Al_2O_3$. The upper surfaces of the first upper pole 17 and protective film 14 are flush with each other.

Figure 10A:
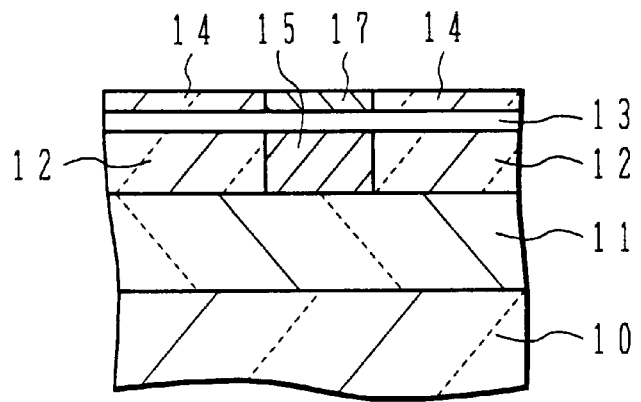
Figure 10B:
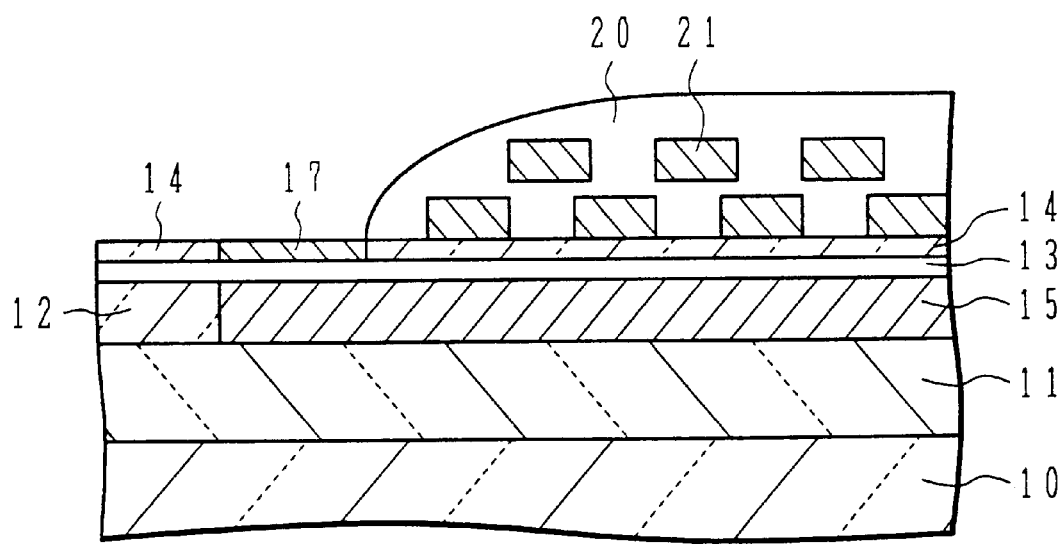

As shown in FIGS. 10A and 10B, on the flat surface of the protective film 14 apart from the first upper pole 17, a plurality of coil layers 21 are formed embedded in an insulating layer 20. The coil 21 is made of, for example, Cu, and the insulating film 20 is made of, for example, $SiO_2$ or $Al_2O_3$. The insulating film 20 is not formed on the first upper pole 17.

Figure 11A:
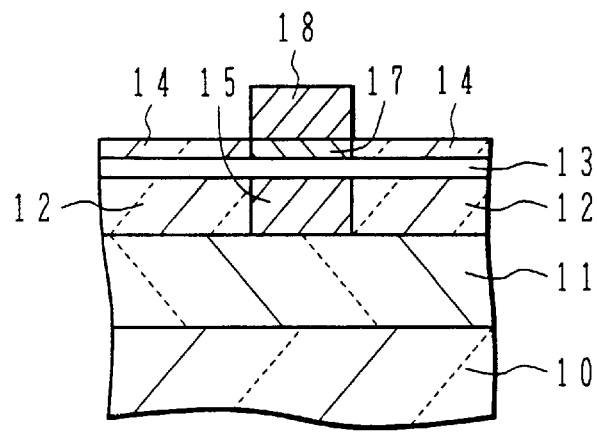
Figure 11B:
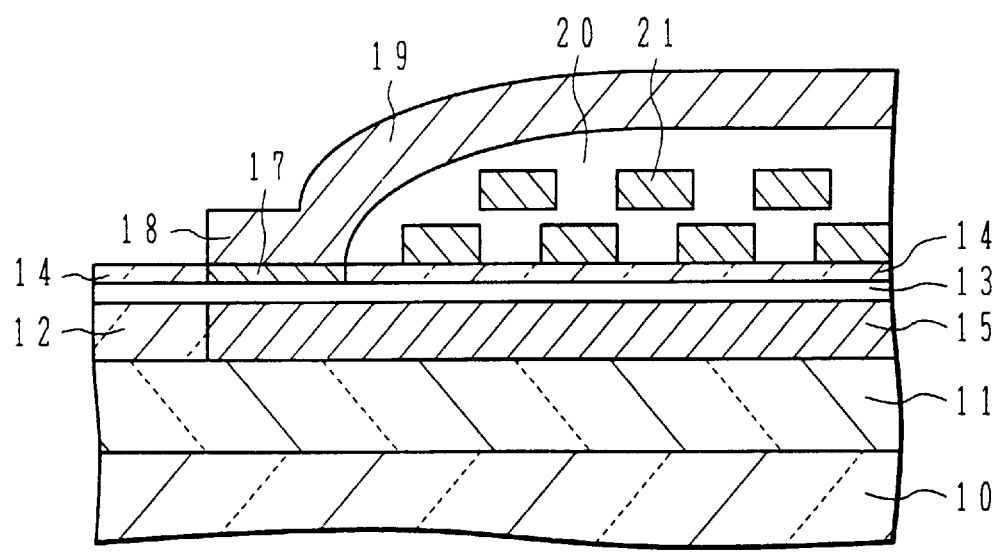

As shown in FIGS. 11A and 11B, an upper magnetic core layer 19 of a predetermined pattern is formed on the insulating film 20 and first upper pole 17. The upper magnetic core layer 19 is made of, for example, permalloy. The tip of the upper magnetic core layer 19 stacked upon the first upper pole 17 has a width same as or greater than that of the first upper pole. A portion of the upper magnetic core layer 19 formed on the first upper pole 17 serves as a second upper pole 18 which constitutes an upper magnetic pole together with the first upper pole 17.

Figure 12A:
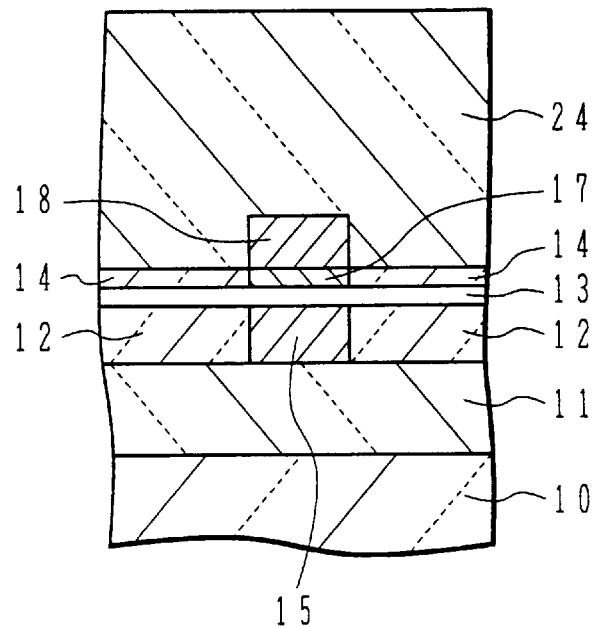
Figure 12B:
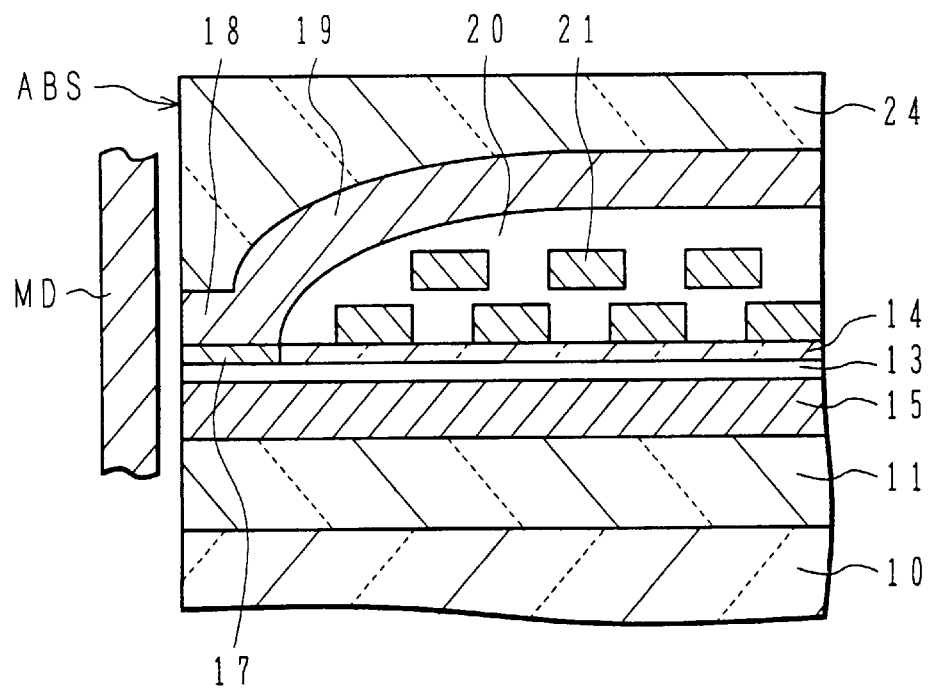

As shown in FIGS. 12A and 12B, after an $Al_2O_3$ film 24 is sputtered over the whole surface, the pole tip portion is polished to a desired length. The polished flat surface of the pole tip is an air bearing surface (ABS) facing a magnetic recording medium MD. In the above manner, the thin film magnetic head shown in FIGS. 1 and 2 can be manufactured.

The upper pole of this thin film magnetic head is constituted of the first and second upper poles 17 and 18. The upper pole 17 is formed before the coil 21 and thick insulating layer 20 are formed. Therefore, the upper pole 17 can be formed highly precisely after the photolithography process which is not affected by the thick insulating layer 20. In this embodiment, therefore, since the width of the first upper pole 17 forming a magnetic path to the lower pole 15' via the gap layer 13 can be precisely determined, a thin film magnetic head can be manufactured which has a sufficient performance for a hard disk of narrow track and high record density. For example, the precision 3σ of the first upper pole is +/−0.2 μm or smaller.

Figure 13:
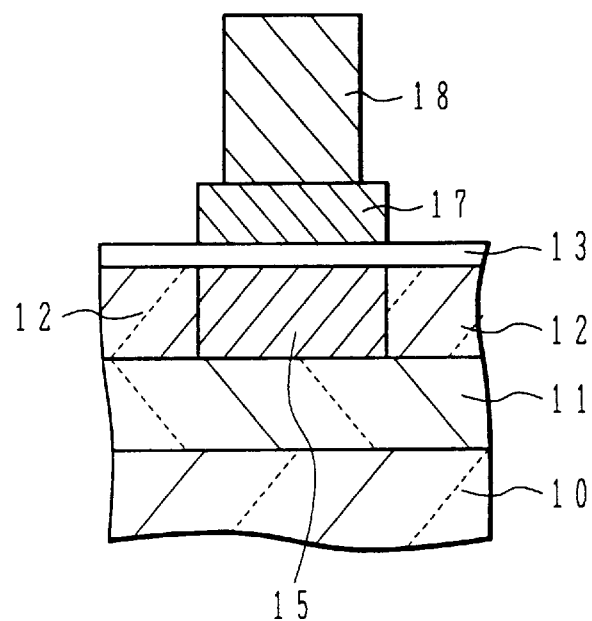
FIG. 13 is a diagram illustrating the reason why a first upper pole is embedded in a protective layer in a coplanar way.
Figure 14:
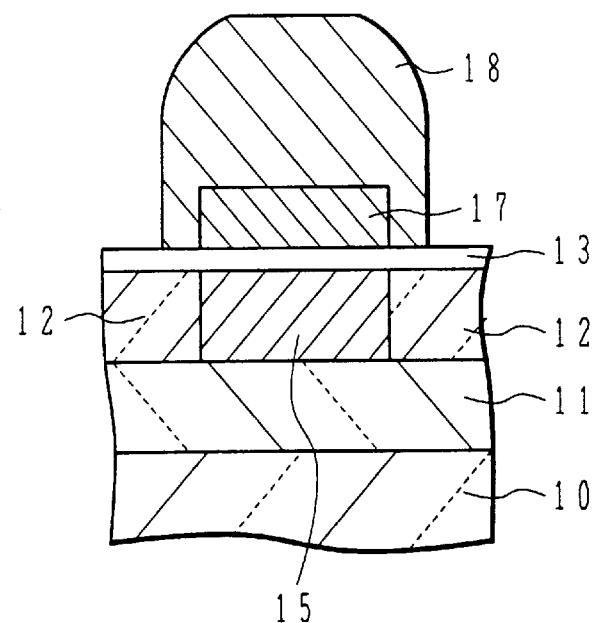
FIG. 14 is a diagram also illustrating the reason why a first upper pole is embedded in a protective layer in a coplanar way.

If the second upper pole 18 is narrower than the first upper pole 17 as shown in FIG. 13, sufficient magnetic fluxes cannot be introduced to the first upper pole 17 which faces the lower pole 15. If the second upper pole 18 is made wider than the first upper pole 17 in order to solve this problem, the second upper pole 18 wider than the first upper pole 17 broadens over the gap layer 13 as shown in FIG. 14 and the track width becomes wider, unless as in this embodiment the first upper pole 17 is embedded in the protective film 14 and the upper surface of the first upper pole 17 is made coplanar to the upper surface of the protective film 14. This problem can be solved by this embodiment which embeds the first upper pole 17 in the protective film 14.

As shown in FIG. 15, a thin film magnetic head manufactured by conventional techniques has an upper pole 26 narrower than a lower pole 25. Therefore, the total magnetic fluxes capable of flowing through the upper pole 26 are smaller than those through the lower pole 25. The magnetic flux density at the trailing edge which is important for data write is likely to become small and a problem of a data write performance arises.

This problem can be solved by the invention, as shown in FIGS. 16A to 16C, by setting the width W2 of a second upper pole 26b same as the width of the lower pole 25 (FIG. 16A) or by setting the width W1 of a first upper pole 26a same as the width of the lower poler 25 (FIG. 16B). In this manner, sufficient magnetic fluxes can be supplied to the lower pole so that the data write performance can be improved. The second upper pole 26b may be gradually widened from the width W1 of the first upper pole 26a to W2 as shown in FIG. 16C. t1 is a thickness of the second upper pole, and t2 is a total thickness of the first and second upper poles. The values W1, W2, t1, and t2 are preferably 1.7 μm, 2.1 μm, 3.5 μm, 5.5 μm, respectively.

Figure 17:
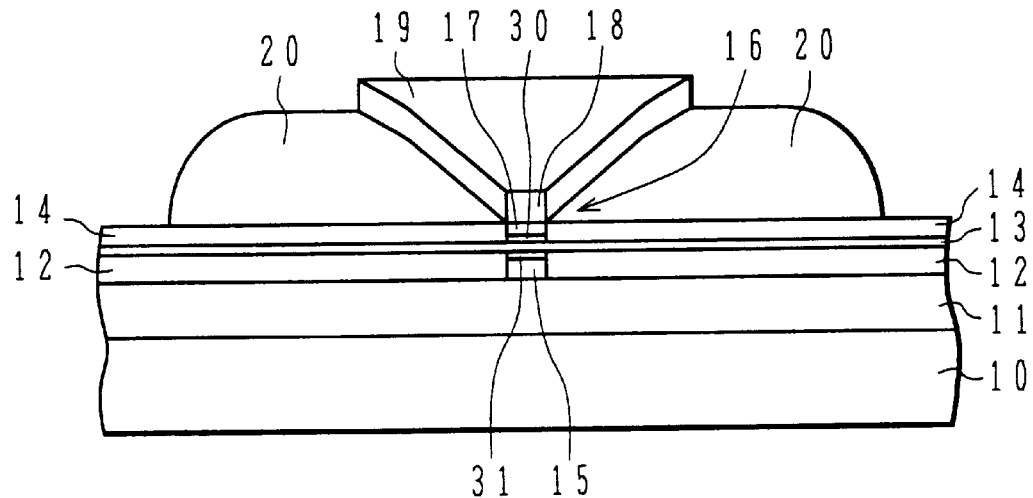
FIG. 17 is a front view of a thin film magnetic head according to a second embodiment of the invention.
Figure 18:
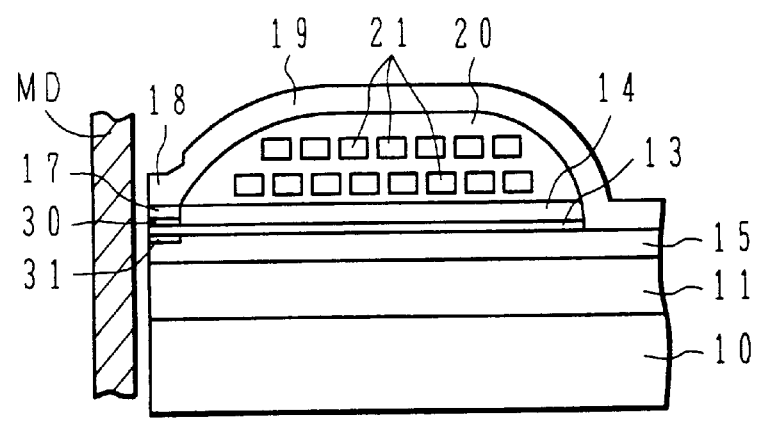
FIG. 18 is a cross sectional view of the thin film magnetic head of FIG. 17 in the longitudinal direction of the magnetic core at the pole center.

FIG. 17 is a front view of a thin film magnetic head according to the second embodiment of the present invention, and FIG. 18 is a cross sectional view of the thin film magnetic head in the longitudinal direction of the magnetic core at the pole center. The different point of the second embodiment from the first embodiment is that high saturation magnetic flux density layers 30 and 31 are formed on the front end surfaces of the first upper pole 17 and lower pole 15' facing each other via the gap layer 13. With these high saturation magnetic flux density layers 30 and 31 formed at the pole front end surfaces sandwiching the gap layer 13, high intensity of field that come about leakage flux between high saturation magnetic flux density layers 30 and 31, can be obtained which allow data to be written in a magnetic recording medium with a high magnetic coercive force (Hc). Since a sharp magnetic field gradient is obtained, it is possible to form sharp magnetization inversion in a recording medium.

If the whole first upper pole 17 is made of 81-permalloy, magnetic fluxes from the first upper pole 17 to the lower pole 15 have high magnetic permeability. If a layer 30 of high saturation magnetic flux density material is formed on the front end surface of the first upper pole 17 facing the gap layer 13, maximum leakage magnetic field of both edge of the gap layer 13 increased to the ratio of high saturation magnetic flux density material to the first upper pole material. Therefore, sufficient magnetic fields for writing data into a recording medium with a high magnetic coercive force can be introduced from the first upper pole 17 to the lower pole 15'. The saturation magnetic flux density Bs of 81-permalloy (81 Ni-19 Fe) is about 8000 G, whereas the saturation magnetic flux density Bs of 94 Co-6 Fe, 45 Ni-55 Fe, or FeTaN is about 16000 G, and that of 30 Fe-25 Co-45 Ni is about 15500 G.

Figure 19A:
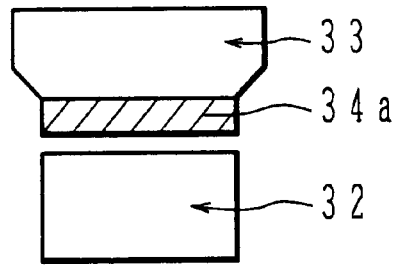
FIGS. 19A to 19C are diagrams showing the relationship between the widths of upper and lower poles of the second embodiment.
Figure 19B:
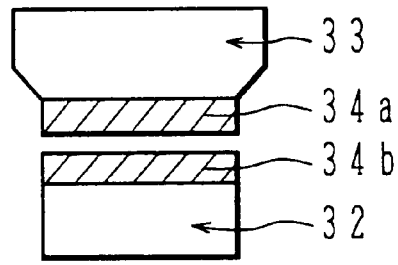
Figure 19C:
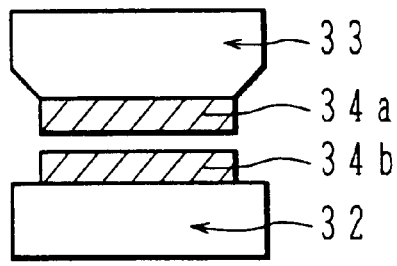

FIGS. 19A to 19C are diagrams showing examples of high saturation magnetic flux density layers formed on a pole.

The pole is constituted of an upper pole 33 and a lower pole 32. As shown in FIG. 19A, the whole first upper pole 34a of the upper pole 33 may be made of high saturation magnetic flux density material, or as shown in FIG. 19B, a portion 34b of the lower pole 32 on the gap layer side may be made of high saturation magnetic flux density material, in addition to the first upper pole 34a, or as shown in FIG. 19C, a width of the lower pole 32 where the high saturation magnetic flux density material is not formed may be broadened. A high saturation magnetic flux density material layer may be partially formed on the first upper pole 34a on the gap layer 13 side.

A high saturation magnetic flux density material layer formed on the first upper pole 34a improves the data write performance. In this case, the area of the first upper pole 34a is so small that it is not likely to have strains to be caused by internal stress or thermal stress. Since the first upper pole 34a is formed on a very small area of the tip of he upper pole 33, even if strains are generated in the first upper pole 34a by stress, the magnetic core and the whole magnetic path are affected less. It is therefore possible to reliably manufacture high performance thin film magnetic heads using high saturation magnetic flux density materials.

A thin film magnetic head was manufactured using the first upper pole made of 45 Ni-55 Fe alloy, and data was written in a magnetic recording medium with a magnetic coercive force Hc of 2300 Oe. As compared to a thin film magnetic head using 81 Ni-19 Fe, NLTS was improved by 3 dB. Stability after a long term of data record was excellent.

Figure 20:
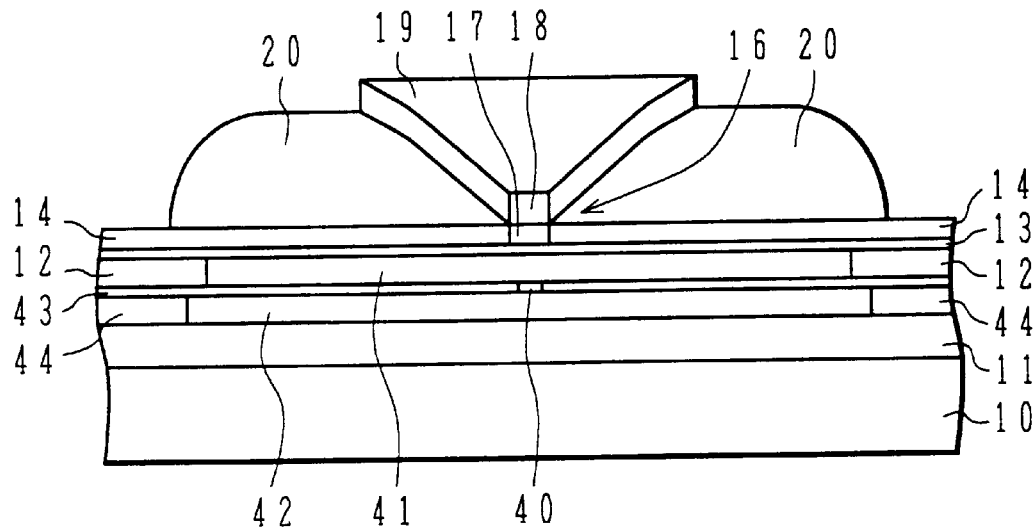
FIG. 20 is a front view of a thin film magnetic head according to a third embodiment of the invention.
Figure 21:
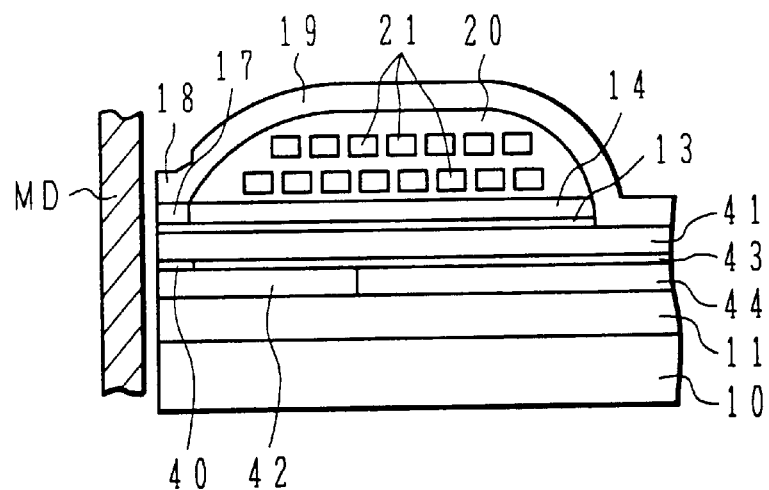
FIG. 21 is a cross sectional view of the thin film magnetic head of FIG. 20 in the longitudinal direction of the magnetic core at the pole center.

FIG. 20 is a front view of a thin film magnetic head according to the third embodiment of the invention, and FIG. 21 is a cross sectional view of the thin film magnetic head of FIG. 20 in the longitudinal direction of the magnetic core at the pole center.

On a protective film 11 formed on a substrate 10, a lower shield layer 42 is formed being embedded in a protective film 44. The lower shield layer 42 is made of, for example, permalloy. On the lower shield layer 42, a magnetoresistive element 40 is formed. A protective film covering the MR element 40 is deposited and polished to form a flat protective film 43. On the protective film 43 embedding the MR element 40, a lower pole 41 serving also as an upper shield layer is formed being embedded in a protective film 12. On the protective film 12 and lower pole 41, a gap layer 13 is formed on which a first upper pole 17 is formed being embedded in a protective film 14. On this protective film 14, an Insulating layer 20 embedding a plurality of coil layers 21 is formed. On the insulating layer 20, an upper magnetic core layer 19 is formed. The tip portion of the upper magnetic core layer 19 constitutes a second upper pole 18 which is stacked on the first upper pole 17 and magnetically coupled thereto. The second and first upper poles 18 and 17 constitute the upper pole.

Figure 22:
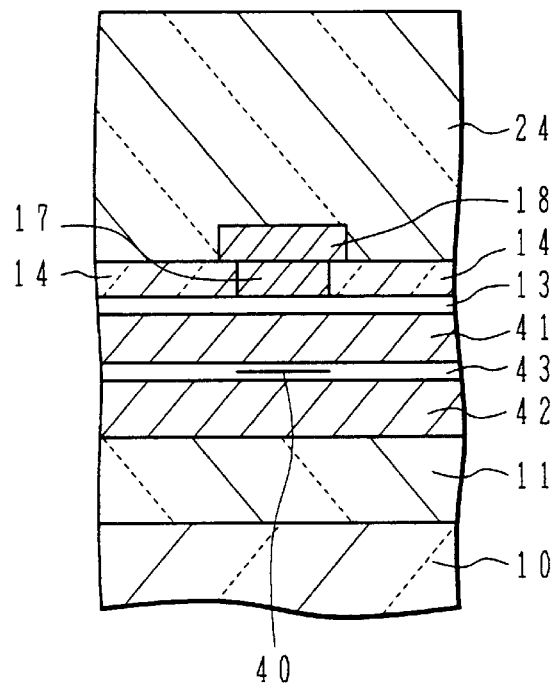
FIG. 22 is an enlarged view of a pole of the thin film magnetic head shown in FIG. 20.
Figure 23:
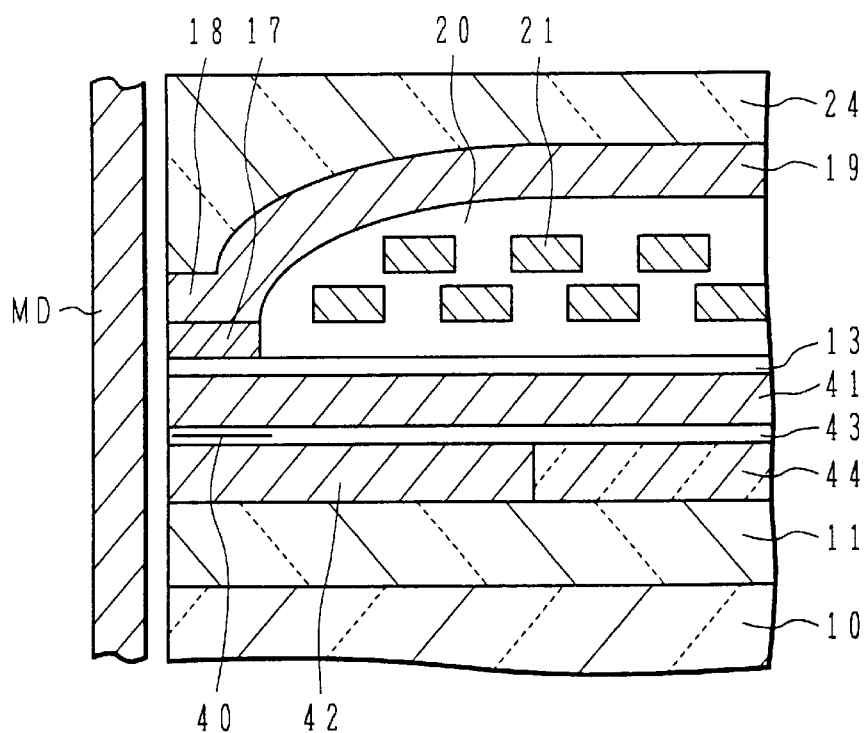
FIG. 23 is an enlarged view of a pole of the thin film magnetic head shown in FIG. 21.

FIGS. 22 and 23 are enlarged views of the pole of the thin film magnetic head shown in FIGS. 20 and 21. As shown, the MR element 40 is embedded in the protective film 43, and sandwiched between the lower shield layer 42 and upper shield layer (lower pole) 41. The first upper pole 17 is positioned facing the MR element 40. The second upper pole 18 is made wider than the first upper pole 17.

In the thin film magnetic head with the MR element of this embodiment, the lower pole 41 for the upper pole (17, 18) also serves as the upper shield layer of the MR element 40.

Figure 24:
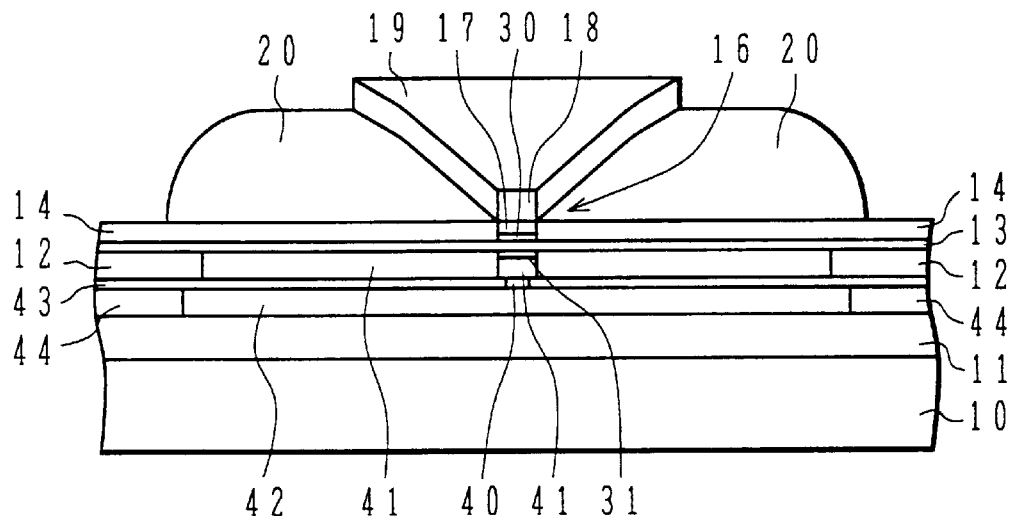
FIG. 24 is a front view of a thin film magnetic head according to a fourth embodiment of the invention.
Figure 25:
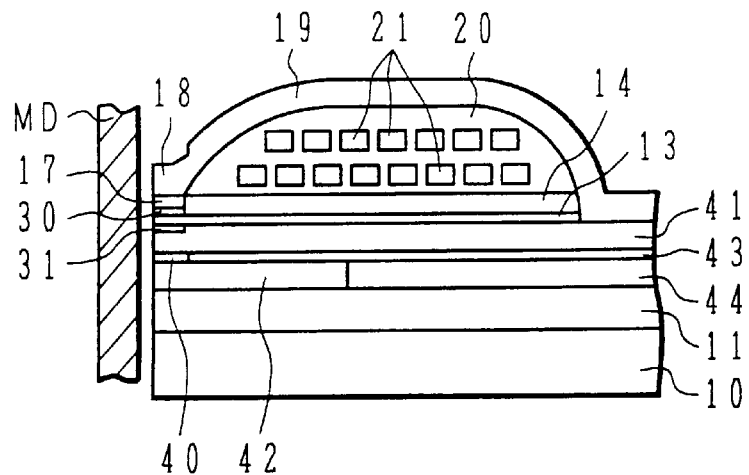
FIG. 25 is a cross sectional view of the thin film magnetic head of FIG. 24 in the longitudinal direction of the magnetic core at the pole center.
Figure 26:
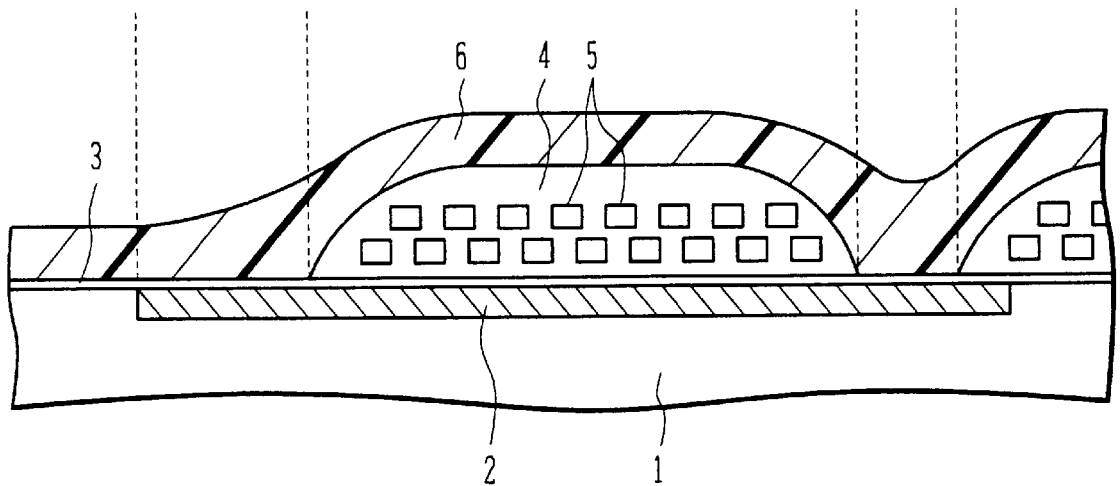
FIG. 26 is a cross sectional view of a conventional thin film magnetic head in the longitudinal direction taken along line A—A of FIG. 28.
Figure 27:
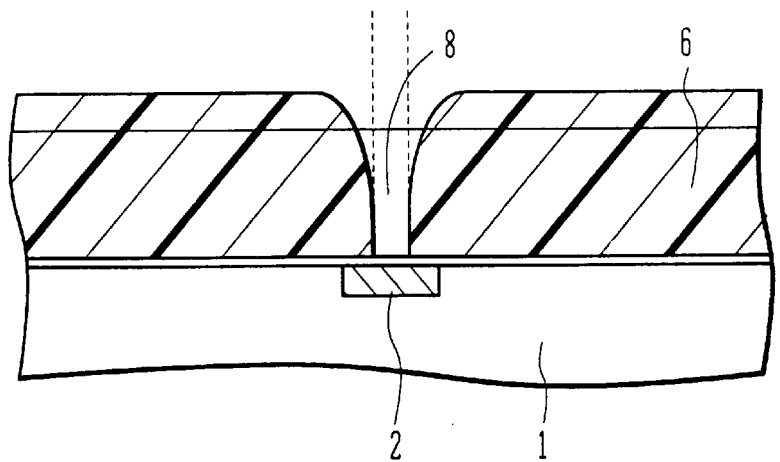
FIG. 27 is a cross sectional view of the conventional thin film magnetic head in the longitudinal direction taken along line B—B of FIG. 28.
Figure 28:
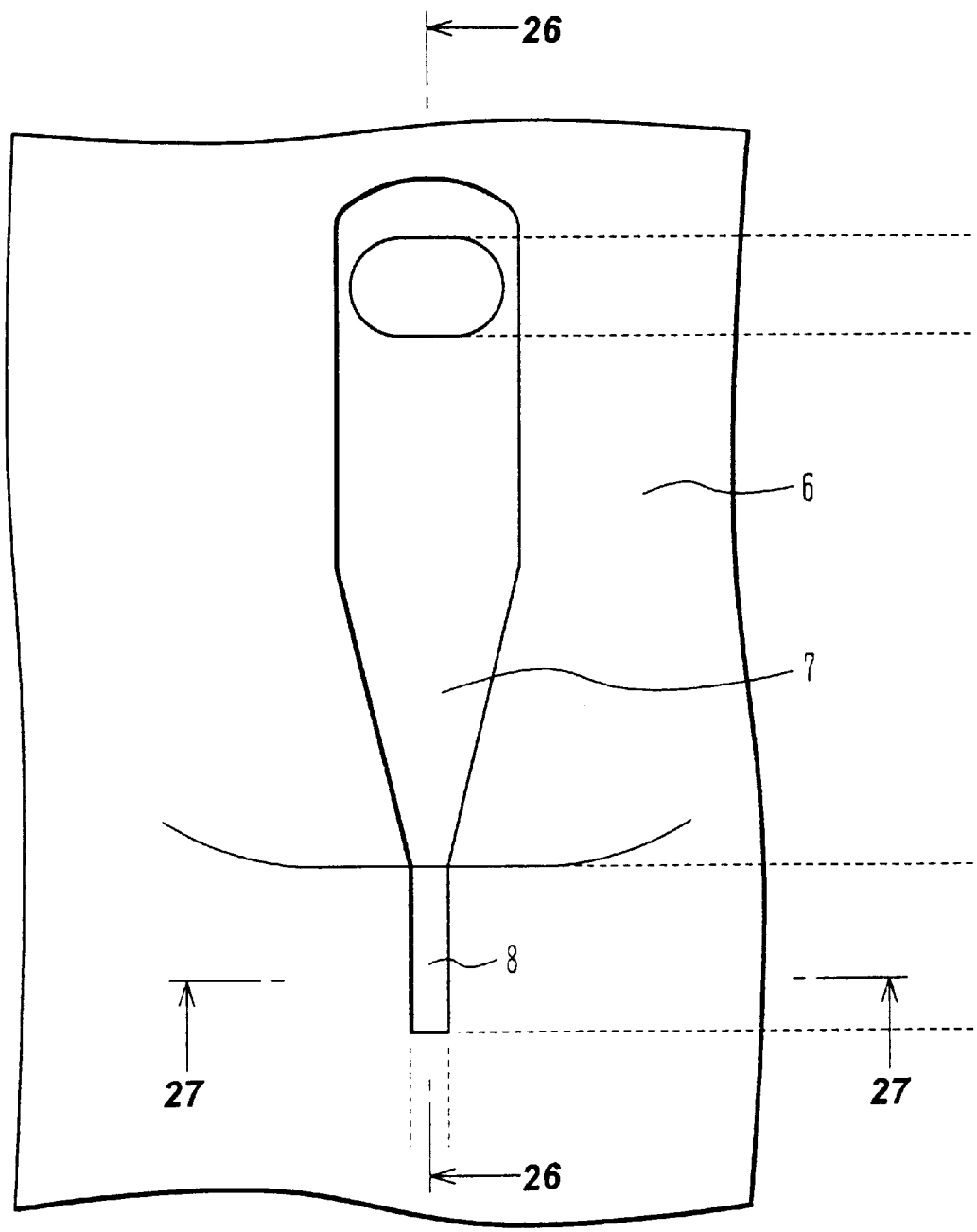
FIG. 28 is a plan view of the thin film magnetic head.

Also for this thin film magnetic head with the MR element, high saturation magnetic flux density layers such as shown in FIGS. 24 and 25 may be formed at the front end surfaces of the first upper pole 17 and lower pole 41 facing the gap layer 13. These high saturation magnetic flux density layers are expected to produce similar effects of the second embodiment shown in FIGS. 17 and 18.

The present invention has been described in connection with the preferred embodiments. The invention is not limited only to the above embodiments. It is apparent to those skilled in the art that various modifications, improvements, combinations and the like can be made without departing from the scope of the appended claims.

We claim:

1. A method of fabricating a magnetic head, comprising the steps of:
   a) providing a substrate;
   b) forming a lower magnetic layer, having a portion serving as a lower pole and a portion serving as a lower magnetic core, on the substrate;
   c) forming a gap layer made of non-magnetic material on the lower magnetic layer;
   d) forming a first upper pole portion on the gap layer;
   e) forming a non-magnetic film over the first upper pole portion;
   f) removing the non-magnetic film to provide the first upper pole portion which is buried in the non-magnetic film and is coplanar to the non-magnetic film; and
   g) providing an upper magnetic layer, having a portion serving as a second upper pole portion and a portion serving as an upper magnetic core portion,
      wherein the second upper pole portion is magnetically connected to the first upper pole portion, and the first and second upper pole portions serve as an upper pole.

2. A method of fabricating a magnetic head according to claim 1, further comprising the steps of:
   h) forming a coil member on the non-magnetic film; and
   i) covering the coil member with an insulating layer to electrically isolate the coil member,
      wherein the upper magnetic core portion is formed on the insulating layer.

3. A method of fabricating a magnetic head according to claim 1, wherein the substrate is made of $Al_2O_3$—TiC.

4. A method of fabricating a magnetic head according to claim 1, wherein the lower magnetic layer and the upper magnetic layer are made of permalloy.

5. A method of fabricating a magnetic head according to claim 1, wherein the first upper pole portion is made of permalloy.

6. A method of fabricating a magnetic head according to claim 1, wherein the gap layer is made of $Al_2O_3$.

7. A method of fabricating a magnetic head according to claim 1, wherein the non-magnetic film is made of $Al_2O_3$.

8. A method of fabricating a magnetic head according to claim 1, wherein the step d) comprises the steps of:
   d-1) forming a first film on the gap layer; and
   d-2) forming a second film on the first film.

9. A method of fabricating a magnetic head according to claim 1, wherein the step d) comprises the steps of:
   d-1) forming a resist pattern having an aperture; and
   d-2) forming a first magnetic layer in the aperture corresponding to the first upper pole portion.

10. A method of fabricating a magnetic head according to claim 8, wherein the first film is made of a material selected from a group consisting of 94 Co-6 Fe, 45 Ni-55 Fe, FeTaN and 30 Fe-25 Co-45 Ni, and the second film is made of permalloy.

11. A method of fabricating a magnetic head, comprising the steps of:

a) providing a substrate;

b) forming a lower magnetic layer, having a portion serving as a lower pole and a portion serving as a lower magnetic core, on the substrate;

c) forming a gap layer made of non-magnetic material on the lower magnetic layer, the gap layer having flat topography;

d) forming a resist pattern, having an aperture, on the gap layer having the flat topography;

e) forming a first upper pole portion made of magnetic material in the aperture in the resist pattern;

f) forming a non-magnetic film over the first upper pole portion;

g) removing the non-magnetic film to provide the first upper pole portion which is buried in the non-magnetic film and is coplanar to the non-magnetic film; and h) providing an upper magnetic layer, having a portion serving as a second upper pole portion and a portion serving as a upper magnetic core portion, wherein the second upper pole portion is magnetically connected to the first upper pole portion and the first and second upper pole portions serve as an upper pole.

12. A method of fabricating a magnetic head according to claim 11, further comprising the steps of:

i) forming a coil member on the non-magnetic film; and j) covering the coil member with an insulating layer to electrically isolate the coil member, wherein the upper magnetic core portion is formed on the insulating layer.

13. A method of fabricating a magnetic head according to claim 11, wherein the substrate is made of $Al_2O_3$—TiC.

14. A method of fabricating a magnetic head according to claim 11, wherein the lower magnetic layer and the upper magnetic layer are made of permalloy.

15. A method of fabricating a magnetic head according to claim 11, wherein the first upper pole portion is made of permalloy.

16. A method of fabricating a magnetic head according to claim 11, wherein the gap layer is made of $Al_2O_3$.

17. A method of fabricating a magnetic head according to claim 11, wherein the step e) comprises the steps of:

e-1) forming a first film on the gap layer; and e-2) forming a second film on the first film.

18. A method of fabricating a magnetic head according to claim 17, wherein the first film is made of a material selected from a group consisting of 94 Co-6 Fe, 45 Ni-55 Fe, FeTaN and 30 Fe-25 Co-45 Ni, and the second film is made of permalloy.

* * * * *